US012574133B2

(12) United States Patent
Mundschenk et al.

(10) Patent No.: US 12,574,133 B2
(45) Date of Patent: Mar. 10, 2026

(54) MOBILE HYBRID RADIO RECEIVER SERVICE FOLLOWING SOURCE SELECTION

(71) Applicant: iBiquity Digital Corporation, Calabasas, CA (US)

(72) Inventors: Russ Mundschenk, Calabasas, CA (US); Harvey Chalmers, Calabasas, CA (US)

(73) Assignee: iBiquity Digital Corporation, Columbia, MD (US)

( * ) Notice: Subject to any disclaimer, the term of this patent is extended or adjusted under 35 U.S.C. 154(b) by 364 days.

(21) Appl. No.: 18/183,724

(22) Filed: Mar. 14, 2023

(65) Prior Publication Data

US 2023/0224056 A1 Jul. 13, 2023

Related U.S. Application Data

(63) Continuation of application No. PCT/US2021/026626, filed on Apr. 9, 2021.

(Continued)

(51) Int. Cl.
*H04H 20/26* (2008.01)
*H04H 20/24* (2008.01)
*H04W 4/06* (2009.01)

(52) U.S. Cl.
CPC ............ *H04H 20/26* (2013.01); *H04H 20/24* (2013.01); *H04W 4/06* (2013.01)

(58) Field of Classification Search
CPC ........ H04H 20/26; H04H 20/24; H04H 60/85; H04W 4/06; H04N 21/4383;

(Continued)

(56) References Cited

U.S. PATENT DOCUMENTS

2009/0054020 A1    2/2009 Mason
2011/0305301 A1    12/2011 Mino
(Continued)

FOREIGN PATENT DOCUMENTS

CN      102291194 A    12/2011
CN      105706382 A    6/2016
(Continued)

OTHER PUBLICATIONS

International Search Report and Written Opinion in counterpart International Application No. PCT/US2021/026626, mailed Jul. 9, 2021, 13 pages.

(Continued)

*Primary Examiner* — Zhitong Chen
(74) *Attorney, Agent, or Firm* — Lerner David LLP

(57) ABSTRACT

A method comprises, at a hybrid radio receiver configured to recover audio content separately from a broadcast radio signal and from a wireless network connection, receiving a reception metric that indicates audio quality of the audio content in the broadcast radio signal at any given time. The method further comprises, deriving, from fluctuations of the reception metric over time, fluctuation indicators that indicate audio quality fluctuations that are likely noticeable to a listener. The method further comprises deriving a switching decision to use the broadcast radio signal or the wireless network connection as a source of the audio content based on a previous switching decision and the fluctuation indicators to introduce hysteresis into the switching decision, and selecting the broadcast radio signal or the wireless network connection as the source of the audio content based on the switching decision.

19 Claims, 5 Drawing Sheets

Related U.S. Application Data

(60) Provisional application No. 63/079,463, filed on Sep. 16, 2020.

(58) Field of Classification Search
CPC ......... H04N 21/44209; H04N 21/8106; H04N 21/4622; H04B 17/318
See application file for complete search history.

(56) References Cited

U.S. PATENT DOCUMENTS

| | | |
|---|---|---|
| 2012/0064820 A1 | 3/2012 | Bemmel |
| 2013/0169881 A1 | 7/2013 | Kano |
| 2013/0343576 A1 | 12/2013 | Pahuja |
| 2015/0079916 A1* | 3/2015 | Wolf .................... H04B 1/1027 |
| | | 455/135 |
| 2015/0124971 A1 | 5/2015 | Haslam |
| 2017/0272143 A1* | 9/2017 | Kroeger ................ H04L 1/0061 |
| 2018/0183536 A1* | 6/2018 | Kelder .................... G10L 25/69 |

FOREIGN PATENT DOCUMENTS

| | | | | |
|---|---|---|---|---|
| EP | 3435564 A1 | 1/2019 | | |
| JP | 2007267027 A | 10/2007 | | |
| JP | 2008042229 A | 2/2008 | | |
| JP | 2013138367 A | * 7/2013 | ....... H04N 21/42638 |
| JP | 2019518344 A | 6/2019 | | |

OTHER PUBLICATIONS

Search Report dated Jun. 28, 25 from the Office Action for Chinese Application No. 202180070530.1 issued Jun. 30, 2025, pp. 1-3.

* cited by examiner

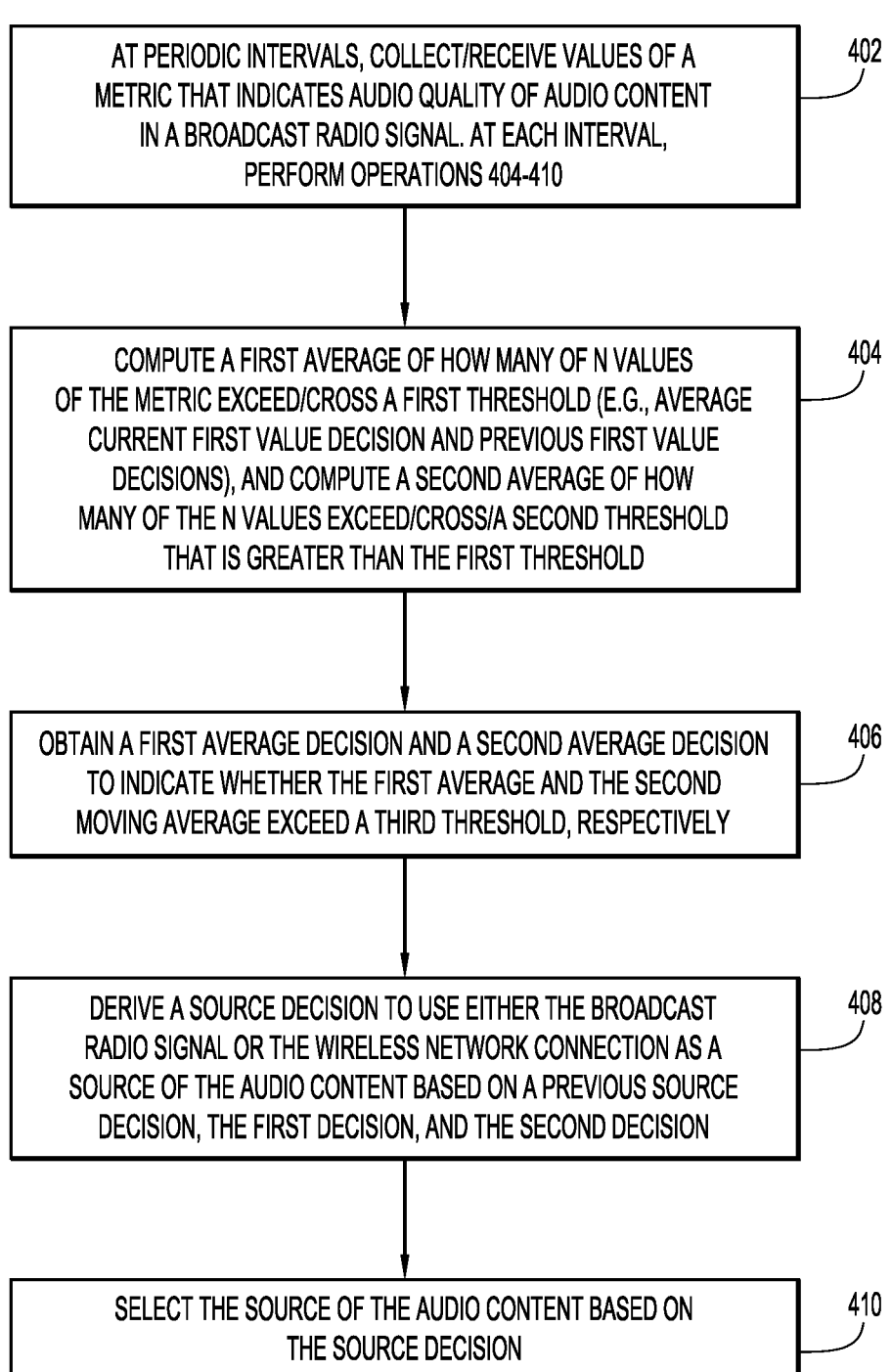

400

AT PERIODIC INTERVALS, COLLECT/RECEIVE VALUES OF A
METRIC THAT INDICATES AUDIO QUALITY OF AUDIO CONTENT
IN A BROADCAST RADIO SIGNAL. AT EACH INTERVAL,
PERFORM OPERATIONS 404-410
402

COMPUTE A FIRST AVERAGE OF HOW MANY OF N VALUES
OF THE METRIC EXCEED/CROSS A FIRST THRESHOLD (E.G., AVERAGE
CURRENT FIRST VALUE DECISION AND PREVIOUS FIRST VALUE
DECISIONS), AND COMPUTE A SECOND AVERAGE OF HOW
MANY OF THE N VALUES EXCEED/CROSS/A SECOND THRESHOLD
THAT IS GREATER THAN THE FIRST THRESHOLD
404

OBTAIN A FIRST AVERAGE DECISION AND A SECOND AVERAGE DECISION
TO INDICATE WHETHER THE FIRST AVERAGE AND THE SECOND
MOVING AVERAGE EXCEED A THIRD THRESHOLD, RESPECTIVELY
406

DERIVE A SOURCE DECISION TO USE EITHER THE BROADCAST
RADIO SIGNAL OR THE WIRELESS NETWORK CONNECTION AS A
SOURCE OF THE AUDIO CONTENT BASED ON A PREVIOUS SOURCE
DECISION, THE FIRST DECISION, AND THE SECOND DECISION
408

SELECT THE SOURCE OF THE AUDIO CONTENT BASED ON
THE SOURCE DECISION
410

FIG.4

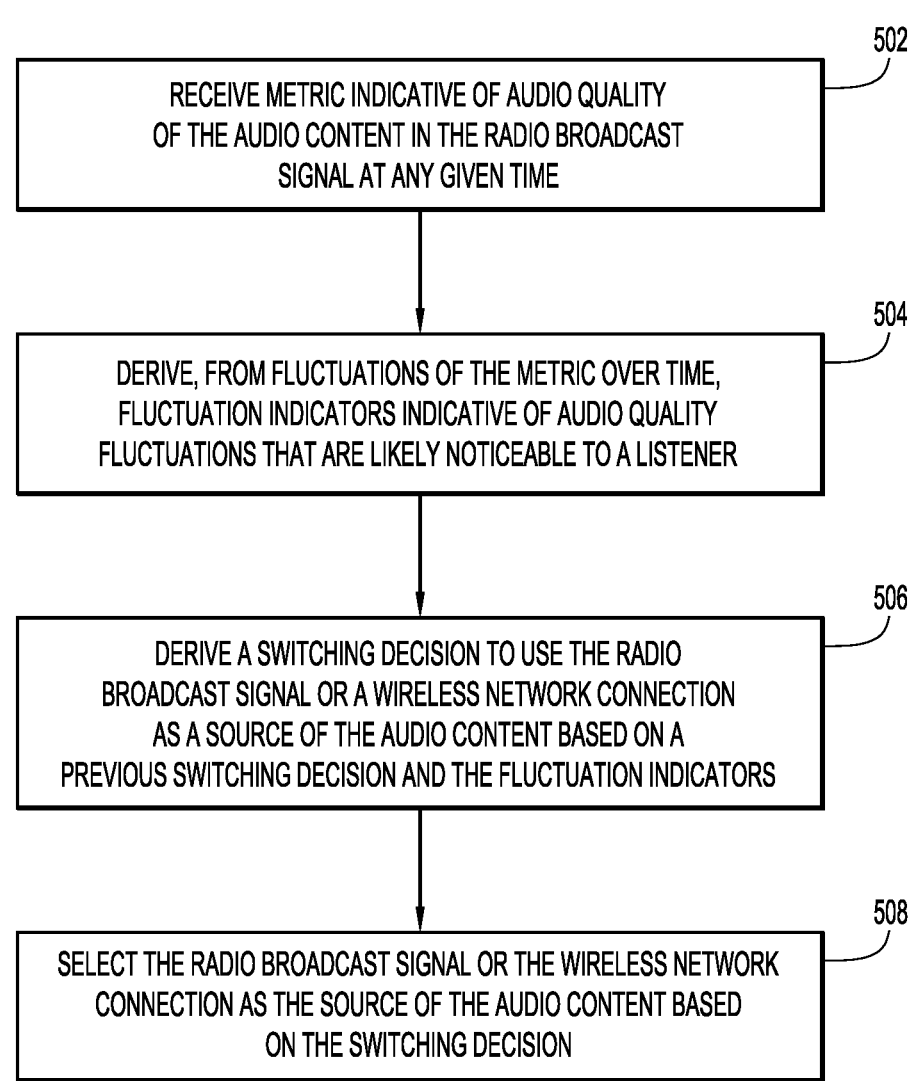

500

502

RECEIVE METRIC INDICATIVE OF AUDIO QUALITY
OF THE AUDIO CONTENT IN THE RADIO BROADCAST
SIGNAL AT ANY GIVEN TIME

504

DERIVE, FROM FLUCTUATIONS OF THE METRIC OVER TIME,
FLUCTUATION INDICATORS INDICATIVE OF AUDIO QUALITY
FLUCTUATIONS THAT ARE LIKELY NOTICEABLE TO A LISTENER

506

DERIVE A SWITCHING DECISION TO USE THE RADIO
BROADCAST SIGNAL OR A WIRELESS NETWORK CONNECTION
AS A SOURCE OF THE AUDIO CONTENT BASED ON A
PREVIOUS SWITCHING DECISION AND THE FLUCTUATION INDICATORS

508

SELECT THE RADIO BROADCAST SIGNAL OR THE WIRELESS NETWORK
CONNECTION AS THE SOURCE OF THE AUDIO CONTENT BASED
ON THE SWITCHING DECISION

FIG.5

MOBILE HYBRID RADIO RECEIVER SERVICE FOLLOWING SOURCE SELECTION

PRIORITY CLAIM

This application is a continuation of International Application No. PCT/US2021/026626, filed Apr. 9, 2021, which claims priority to U.S. Provisional Patent Application No. 63/079,463, filed Sep. 16, 2020, the entireties of which are incorporated herein by reference.

TECHNICAL FIELD

The present disclosure relates to recovery of audio content by a hybrid radio receiver.

BACKGROUND

Mobile hybrid radio receivers can recover streaming audio content from a broadcast radio signal and from a wireless network signal over an Internet Protocol (IP) connection (e.g., a wireless IP connection). Movement of the hybrid radio receiver causes radio frequency (RF) reception conditions to vary. Under such conditions, the hybrid radio receiver may switch its source of audio from the broadcast radio signal to the wireless IP connection, which can incur significant network service charges and, if poor decisions of when to switch occur, poor quality audio from the perspective of a listener may result. The hybrid radio receiver may employ conventional switching techniques to determine when to switch to the IP connection. One technique includes monitoring a receive signal strength indicator (RSSI) of the broadcast radio signal, or deriving what is essentially an equivalent RSSI based on a known geographic position of the hybrid radio receiver, and switching to the IP connection when the RSSI indicator falls below a single threshold. The fact that the RSSI is an indirect indicator of audio quality, and relies on a single threshold, causes a coarse, often poor, switching decision that can be overly aggressive (i.e., too quick) or not aggressive enough (i.e., too slow). Consequently, the user/listener may experience poor audio quality and increased network service charges.

Another technique includes comparing a location of the hybrid radio receiver to predetermined geographical coordinates representative of a geofence boundary, and triggering a switch to the IP connection based on the comparison. This technique may also produce a suboptimal switching decision because it does not take into account actual reception conditions experienced by the hybrid radio receiver or differing reception performance associated with differing types of hybrid radio receivers. Thus, using the geofence as a basis for the switching decision can result in poor audio quality, and increased network service charges.

BRIEF DESCRIPTION OF THE DRAWINGS

FIG. 4 is a flowchart of an example of the switching algorithm.

FIG. 5 is a flowchart of another example of the switching algorithm.

DESCRIPTION OF EXAMPLE EMBODIMENTS

Example Embodiments

Figure 1:
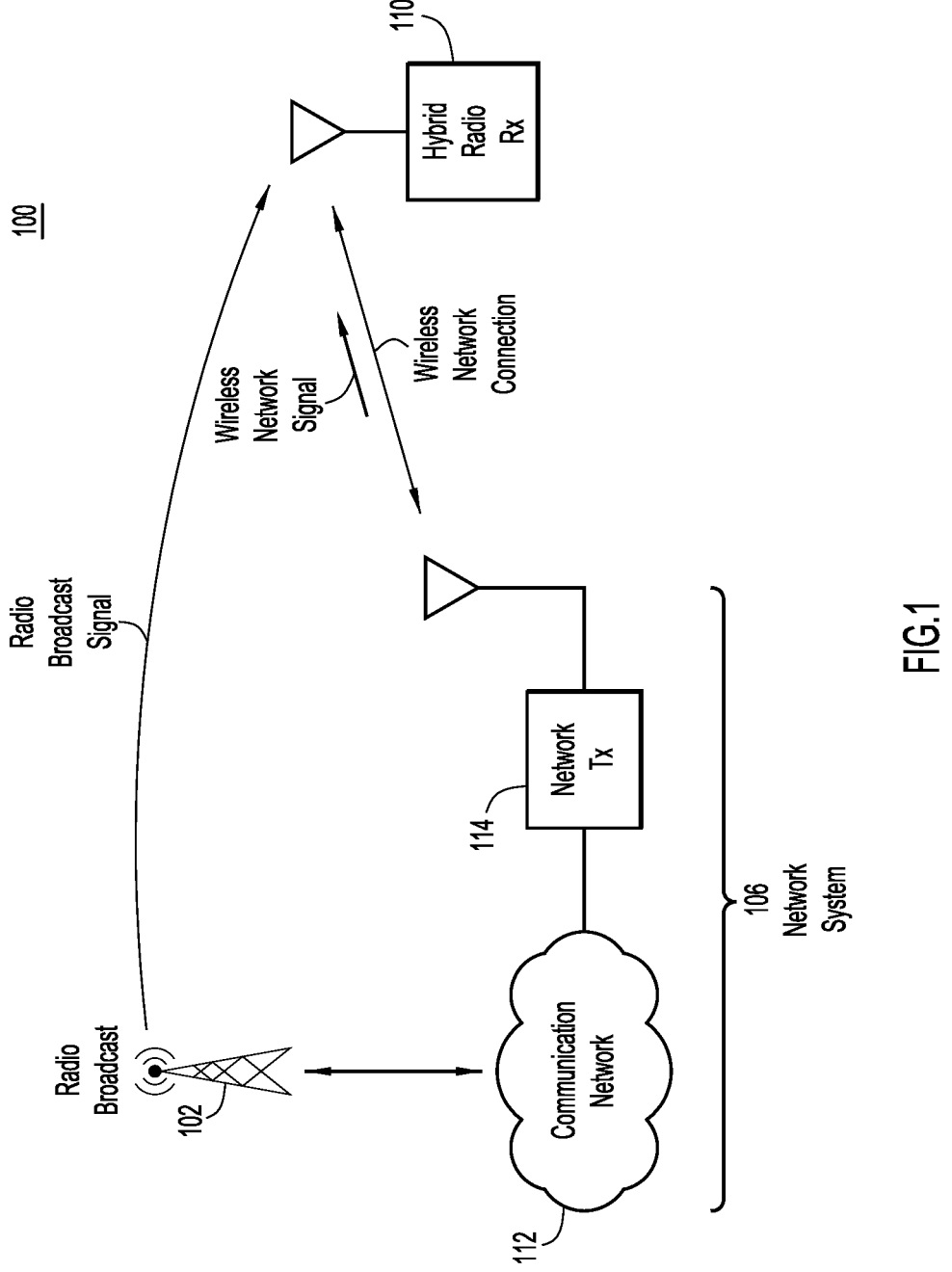
FIG. 1 is a high-level block diagram of an example hybrid radio system.

Embodiments presented herein may be implemented in a hybrid radio receiver capable of rendering audio (e.g., playback of the audio) and metadata obtained from multiple over-the-air (OTA) or wireless sources including both a broadcast radio source (e.g., a broadcast radio signal) as well as a wireless network source (e.g., a wireless IP connection). As the hybrid radio receiver changes location, RF reception conditions can vary significantly due to signal strength, adjacent channel interference levels, and multipath interference. It is thus important for the hybrid radio receiver to know which OTA source to select for the audio and metadata at any given time for a best user listening experience at a minimum cost. Although streaming audio and metadata recovered from a broadcast radio signal, such as an analog frequency modulation (FM) broadcast radio signal, is free of charge to a user, the user may incur data charges when streaming the audio and metadata from an IP connection through a cellular data modem, for example. In addition, radio broadcasters may incur significant royalty charges for providing streaming services via the IP connection and are thus incentivized to ensure that users utilize the broadcast radio signal rather than the IP connection whenever possible.

Accordingly, the embodiments presented herein include a switching algorithm configured to produce a switching or source decision to use either the broadcast radio signal or the wireless IP connection as a "best" source from which to obtain audio and metadata based on a reception or audio quality metric (also referred to simply as the "metric" in the ensuing description) that is derived from the broadcast radio signal and is indicative of audio quality. Field tests have demonstrated that the switching decision highly correlates with results obtained via subjective evaluations of audio captured during mobile testing in the field, e.g., car drive testing. The switching algorithm ensures that the broadcast radio signal is selected as the source for audio instead of the IP connection when the audio quality is good in accordance with criteria established by the switching algorithm, thus satisfying the desire to minimize IP data usage both from a user as well as from a broadcaster cost perspective.

The metric processed by the switching algorithm to render the switching decision is readily available from, or readily derivable by, most modern automotive FM radio tuner integrated circuits (ICs). Such ICs compute and render one or metrics to control internal audio soft mute and high cut. The metric reflects or is indicative of a level of undesired, fast-changing audio fluctuations, which may be caused by multipath interference, for example, that are noticeable to a listener. At a high-level, the switching algorithm counts a respective number of times the metric crosses each of two spaced-apart thresholds within a predetermined time period. The switching algorithm computes/determines fluctuation indicators based on the respective numbers of crossings, and then renders the switching or source decision to use either the broadcast radio signal or the wireless network connection as the source of audio and metadata based on the metric fluctuation indicators. Subjective listening tests of various automotive drive routes in the field have demonstrated that the switching algorithm produces a switching decision that agrees quite closely with human listening preferences. This is because human hearing is sensitive to change in audio quality, and the switching algorithm essentially counts fluctuations between good and bad audio quality.

Advantageously, the switching algorithm:

a. Is implemented as a low cost solution in the hybrid radio receiver.

b. Is based on a direct measure of audio quality that a user actually perceives vs. received signal strength indicator (RSSI) values, which are indirect and therefore often inaccurate.

c. Automatically adapts to various types of hybrid radio receivers and vehicle installation performance, thus, the switching algorithm does not switch away from high quality audio recovered from a broadcast radio signal too aggressively in high quality radio receivers that have a high-performance antenna system.

d. Provides straightforward adjustment of the aggressiveness of IP connection vs. broadcast radio source selection by a simple adjustment of several simple threshold and time interval parameters. Thus, it is a straightforward extension for a radio broadcaster to deliver an aggressiveness setting for their broadcast radio station(s) through the IP connection.

e. The implementation of the switching algorithm in the hybrid radio receiver lends itself to straightforward testing/evaluation by generating a test RF signal and directly evaluating the switching decision; no location information is required.

With reference to FIG. 1, there is a high-level block diagram of an example radio system 100. Radio system 100 includes a radio broadcast station 102 to transmit a broadcast radio signal (equivalently be referred to as a radio broadcast signal), a network system 106 to transmit a wireless network signal over a wireless network connection, and a mobile/portable hybrid radio receiver (Rx) 110 configured to implement the switching algorithm according to the embodiments presented herein. In one example, the broadcast radio signal may include a conventional analog FM radio signal. In another example, the broadcast radio signal may include an analog amplitude modulated (AM) radio signal. The broadcast radio signal conveys/carries audio content to hybrid radio receiver 110. The audio content includes audio and may or may not also include metadata, such as text, timing information, and/or images. The audio content may include streamed audio with metadata embedded in the audio, for example.

Network system 106 includes a communication network 112 communicatively coupled to network transmitter (Tx) 114 to transmit a wireless network signal. Communication network 112 may include one or more wide area networks (WANs), such as the Internet, and one or more local area networks (LANs), content programming producers, cellular networks, WiFi networks, and the like. Examples of network transmitter 114 may include a cellular tower associated with cellular networks, a transmitter that operates in accordance with the IEEE 802.11 suite of protocols (e.g., WiFi®), and so on. Network transmitter 114 receives network data in the form of data packets from communication network 112. Network transmitter 114 transmits the wireless network signal (e.g., a cellular or WiFi signal) that includes the data packets to hybrid radio receiver 110, typically over the wireless network connection (e.g., a wireless IP connection) with the hybrid radio receiver. The wireless network signal may carry/convey the same or different audio content as is conveyed by the broadcast radio signal. In addition, network transmitter 114 and radio broadcast station 102 may transmit their respect OTA signals, and audio content, concurrently.

Hybrid radio receiver 110 implements the switching algorithm. Hybrid radio receiver 110 applies the switching algorithm to the broadcast radio signal and the wireless network signal (collectively referred to as the "OTA received signals") based on the above-described metric to select one of the OTA received signals as a source of audio content. The switching algorithm will be described in detail below in connection with FIGS. 3-5.

Figure 2:
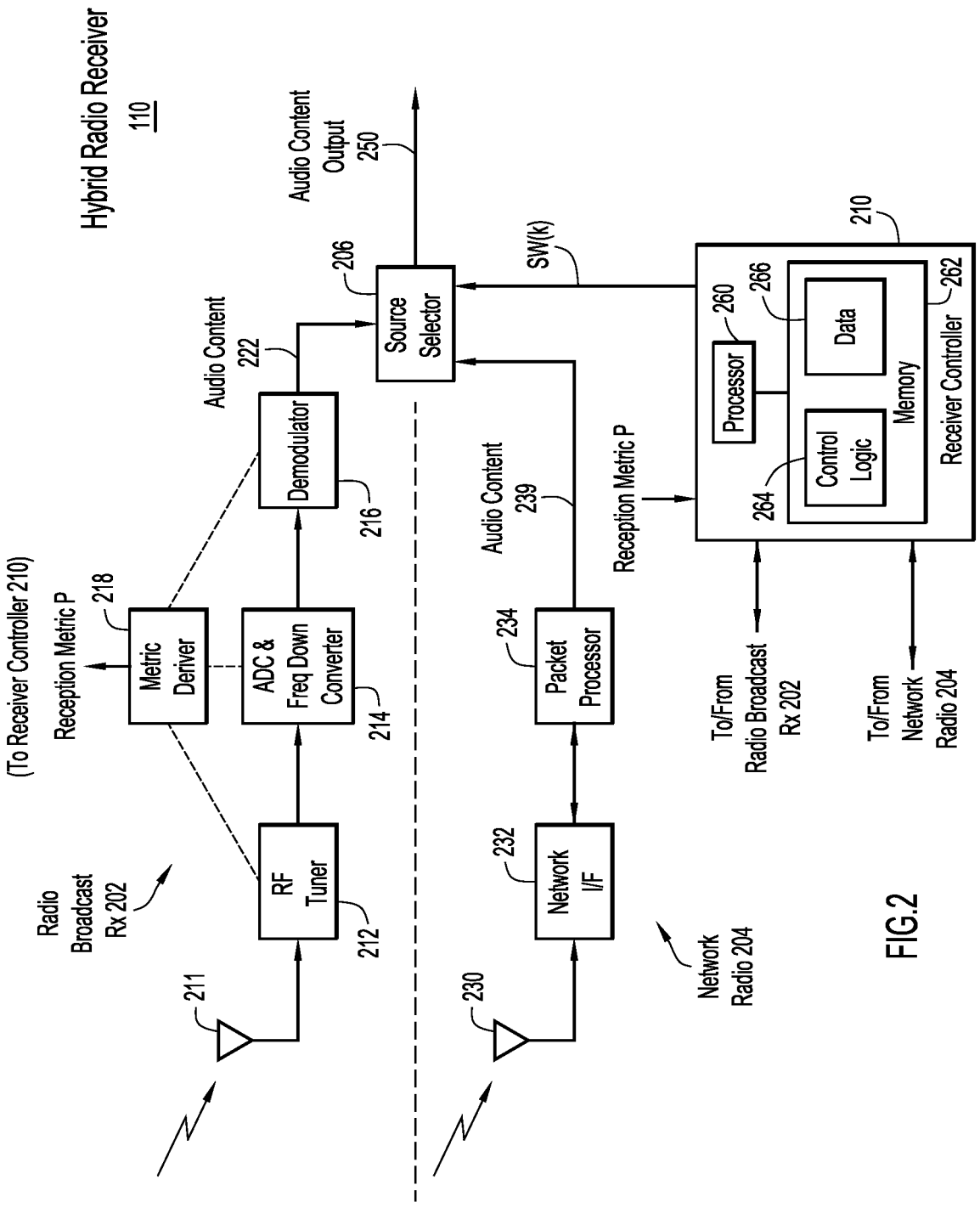
FIG. 2 is a block diagram of an example hybrid radio receiver of the radio system and that implements a switching algorithm to derive a switching decision to use a broadcast radio signal or a wireless network connection as a source for audio content, according to embodiments presented herein.

FIG. 2 is a functional block diagram of a portion of hybrid radio receiver 110, according to an embodiment. Hybrid radio receiver 110 includes a radio broadcast receiver 202, a wireless network radio 204 (e.g., an IP radio), a source selector or switch 206, and a receiver controller (also referred to simply as a "controller") 210 all communicatively coupled to each other. Portions of radio broadcast receiver 202, portions of wireless network radio 204, and source selector 206 may be incorporated into controller 210.

Radio broadcast receiver 202 includes an antenna 211, an RF tuner 212, a combined analog-to-digital converter (ADC)/frequency down-converter 214, a demodulator 216, and a metric deriver 218. Antenna 211 delivers a broadcast radio signal received by the antenna to RF tuner 212. The broadcast radio signal carries/conveys audio content including audio and metadata, or just audio. RF tuner 212 tunes to a desired RF channel of the broadcast radio signal, frequency down-converts the RF channel to an intermediate frequency (IF) signal, and provides the IF signal to ADC/frequency down-converter 214. ADC/frequency down-converter 214 digitizes and frequency down-converts the IF signal to a digitized baseband signal, and provides the baseband signal to demodulator 216.

Demodulator 216 demodulates the baseband signal to audio content 222, and delivers the audio content to source selector 206. Demodulator 216 may also provide any metadata included in audio content 222 directly to controller 210. Examples of demodulator 216 include an FM demodulator to demodulate an FM broadcast radio signal, and an AM demodulator to demodulate an analog AM broadcast radio signal. In summary, radio broadcast receiver 202 is configured to recover audio content carried/conveyed by the broadcast radio signal, to produce audio content 222.

Metric deriver 218 includes circuitry/logic configured to derive reception metric P from/based on the broadcast radio signal. Metric deriver 218 may be integrated with tuner 212, ADC/frequency down-converter 214, and/or demodulator 216 to derive audio quality metric P from the RF, IF, baseband signals, and/or demodulated audio, respectively. For example, when integrated with, or positioned after, demodulator 216, metric deriver 218 may derive or measure metric P directly from audio content 222.

Metric P indicates, or is correlated to, the audio quality of audio in audio content 222 to a listener at any given time. Metric P may represent an unprocessed and unweighted measurement of the audio quality. Time-varying or time-dependent (i.e., dynamic) fluctuations of metric P are correspondingly indicative of audio quality fluctuations. When sufficiently large, the number and magnitude of the dynamic fluctuations of metric P over time are correspondingly indicative of audio quality fluctuations that are likely noticeable and annoying to a listener. Thus, metric P may represent undesired level or amplitude fluctuations in the broadcast radio signal (e.g., an FM broadcast radio signal) that are not present in the broadcast radio signal as originally transmitted, and that translate to fluctuations in audio quality. The undesired fluctuations may result from multipath conditions in the environment, for example. Thus, metric P may be referred to as a multipath metric or indicator. In summary, dynamic fluctuations of metric P may be considered indicative of a degradation of the audio quality to a listener.

In an example, metric deriver 218 may include a wideband AM detector that captures fast varying level fluctuations of an FM-modulated envelope of the broadcast radio signal at a granularity of approximately 1 or 2 milliseconds (ms). Radio broadcast receiver 202 provides controller 210 with access to metric P through an interface between the controller and the radio broadcast receiver.

Network radio 204 includes an antenna 230, a wireless network interface (I/F) 232, and a packet processor 234. Wireless network I/F 232 establishes a bi-directional wireless network connection (e.g., an IP connection, or other type of data connection) with a communication network through antenna 230. Wireless network I/F 232 may include a Wi-Fi interface component and/or a cellular interface component for transmitting and receiving wireless RF signals, for example. In a receive direction, wireless network I/F 232 receives data packets, encoded with audio content (e.g., audio and metadata), from the communication network, and passes the data packets to packet processor 234. Packet processor 234 decodes the data packets to recover the audio content (represented at 239). Packet processor provides audio content 239 to source selector 206, and may provide any metadata in the audio content directly to controller 210. In a transmit direction, network radio 204 wirelessly transmits data packets to the communication network.

In an embodiment, network radio 204 monitors/determines an integrity or quality of the wireless network connection, and provides an indicator or metric (referred to as a wireless network connection quality indicator) to controller 210 that indicates whether the quality of the wireless network connection is good/acceptable (e.g., within a connection quality constraint), or bad/not-acceptable (e.g., outside of the quality constraint). Network radio 204 may use any known or hereafter developed technique to monitor the quality of the wireless network connection, including determining whether a rate of lost data packets is within a quality constraint, determining whether data packet decoding errors are within a quality constraint, whether an RSSI of the wireless network signal is within a quality constraint, and so on.

Source selector 206 receives, from controller 210, a switching signal SW(k) that controls the source selector. Controller 210 derives switching signal SW(k) based on the switching algorithm, as will be described below. Based on a state of switching signal SW(k), source selector 206 selects either audio content 222 recovered from the broadcast radio signal by radio broadcast receiver 202 or audio content 239 recovered from the wireless network connection by network radio 204 as output audio content 250. Source selector 206 may provide audio of output audio content 250 to an audio output interface or device (not shown in FIG. 2), such as an audio port or loudspeaker, for playback to a listener.

Controller 210 controls radio broadcast receiver 202 and network radio 204 and, in an embodiment, is primarily responsible for implementing the switching algorithm. Controller 210 is coupled to and communicates with radio broadcast receiver 202 and network radio 204 over respective interfaces with the radio broadcast receiver and the network radio. Controller 210 includes processor(s) 260 and a memory 262. Memory 262 stores control software 264

(referred as "control logic"), that when executed by the processor(s) 260, causes the processor(s), and more generally, controller 210, to perform the various operations described herein for hybrid radio receiver 110. The processor(s) 260 may be a microprocessor or microcontroller (or multiple instances of such components). The memory 262 may include read only memory (ROM), random access memory (RAM), magnetic disk storage media devices, optical storage media devices, flash memory devices, electrical, optical, or other physically tangible (i.e., non-transitory) memory storage devices. Controller 210 may also be discrete logic embedded within an IC device.

Thus, in general, the memory 262 may comprise one or more tangible (non-transitory) computer readable storage media (e.g., memory device(s)) encoded with software or firmware that comprises computer executable instructions. For example, control software 264 includes logic to implement operations of the switching algorithm performed by the controller 210 and, more generally, hybrid radio receiver 110. Thus, control software 264 implements the various methods/operations described herein.

In addition, memory 262 stores data 266 used and produced by control software 264.

Figure 3:
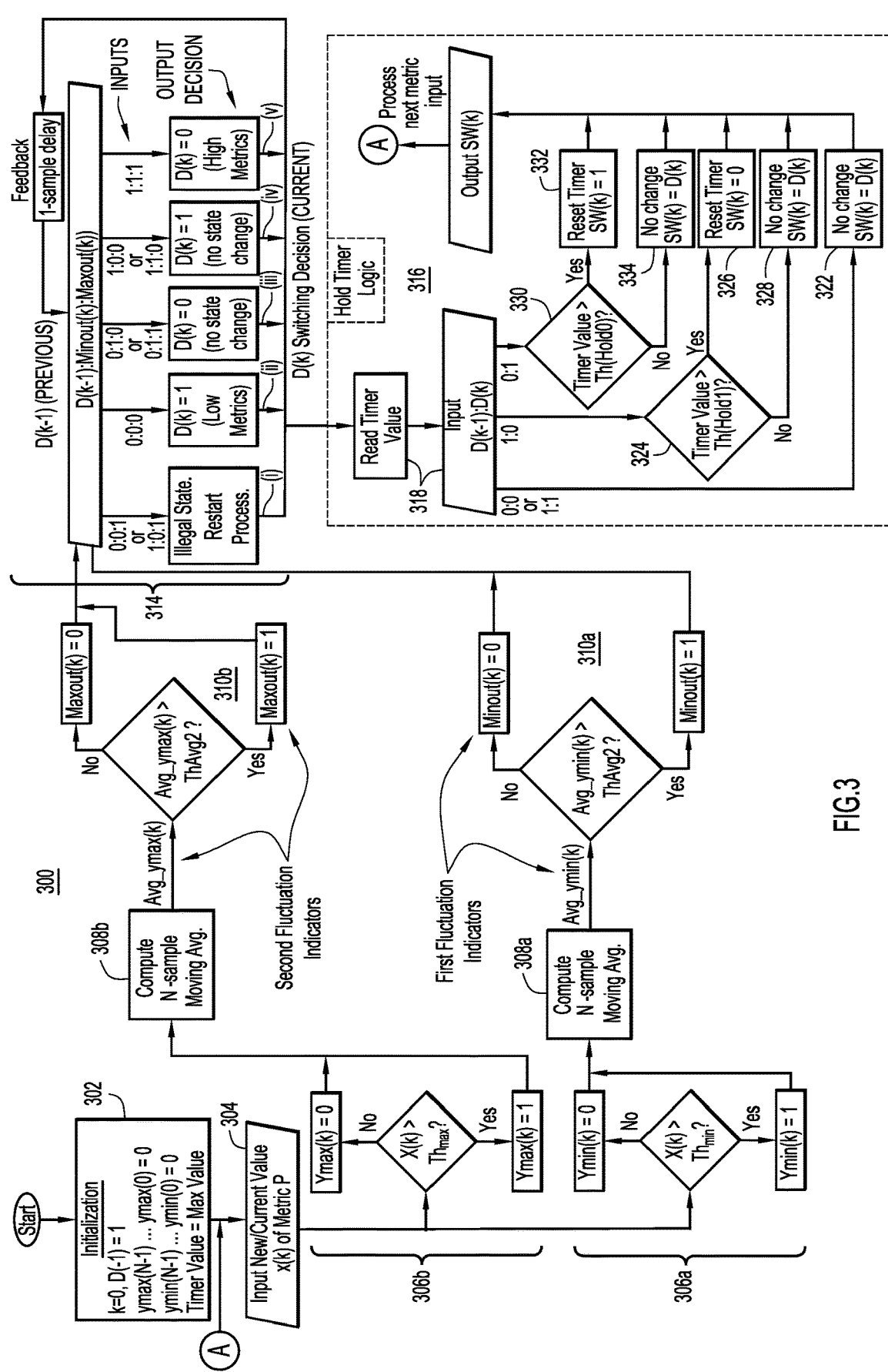
FIG. 3 is a flow diagram of an example of the switching algorithm, which derives the switching decision based on a reception metric that indicates audio quality associated with the broadcast radio signal.

FIG. 3 is a flow diagram of an example switching algorithm 300 (also referred to simply as the "algorithm") that may be implemented by controller 210. At a high-level, the algorithm periodically reads or collects input values or samples of metric P from radio broadcast receiver 202 at regular intervals, such as every 100 ms, for example. The algorithm may use intervals that are less than or greater than 100 ms. The algorithm repeats operations that operate on each "current" value of metric P that is collected to derive a per-value switching decision to use either the broadcast radio signal or the wireless network signal/wireless network connection as the source of audio corresponding to the current value. Thus, the operations represent per-value or per-interval operations that derive the switching decision on the per-value/per-interval basis.

For example, the algorithm (i) collects a first value of metric P, and processes the first value in a first pass through the operations to derive a first switching decision corresponding to the first value, (ii) collects a second value of metric P, and processes the second value in a second pass through the operations to derive a second switching decision corresponding to the second value, and so on. In the above example, when the second pass through the operations is referred to as a "current" pass or iteration, the first pass is referred to as a "previous" pass or iteration.

At each "current" iteration, the algorithm derives a current switching decision based on (i) the current value of metric P, (ii) a number of previous values of the metric, and (iii) a previous switching decision. Reliance on the current value, the previous values, and the previous switching decision to derive the current switching decision introduces hysteresis into the switching decision, which helps avoid overly aggressive switching between the broadcast radio signal and the wireless network connection as the source of audio content, as RF reception conditions vary.

The algorithm is now described in detail. At 302, the algorithm initializes variables employed by the algorithm and depicted in FIG. 3. Various variables and their example initialization/default values are introduced in Table 1, below.

TABLE 1

| Input Variable Name | Description | Range | Default Value |
|---|---|---|---|
| x | Algorithm Input Value for Metric P (e.g., Multipath) | 0-100% | 0 (No Multipath) |
| k | Sample Iteration Index | Integer | 0 |
| D (Output) | Algorithm Decision | 0, 1 (Boolean) | 0 (No Listen) |
| $Th_{min}$ | Min Input Threshold | 0-100% | 5 |
| $Th_{max}$ | Max Input Threshold | 0-100% | 18 |
| N | No. Input Thresh Decision Avgs | 1-12000 Avgs?? | 450 Avgs |
| ThAvg2 | Averaged Input Decision Thresh | 0-100% | 50% |
| Th(Hold0) | Hold Time for D = 0 to D = 1 Tans | 0-120 Sec | 40 seconds |
| Th(Hold1) | Hold Time for D = 1 to D = 0 Tans | 0-120 Sec | 15 seconds |

At 304, the algorithm receives or collects a new/current value x(k) of metric P from radio broadcast receiver 202, where k indicates a current iteration of the algorithm that will use value x(k) to derive a current switching decision D(k) based on previous values x(k−1), x(k−2), and so on, and based on a previous switching decision D(k−1). In the ensuing description, because value x(k) represents metric P, value x(k) may itself be referred to as the "metric," or as "metric x(k)." In an example, value x(k) may be an 8-bit value converted to a percentage 0-100%. The lower and higher the value, the better and worse the audio quality. In other words, a degradation in audio quality increases with value x(k) of metric P. In another example, the lower and higher the value, the worse and better is the audio quality.

At 306*a* the algorithm determines/evaluates whether metric x(k) is above or below a minimum input threshold $Th_{min}$ (also referred to as a "first threshold"), to produce a first value decision Ymin(k). The algorithm records the results of thresholding test 306*a* as follows:

a. Is metric x(k)>$Th_{min}$?
        Yes→Ymin(k)=1.
        No→Ymin(k)=0.

As used herein, the term "thresholding" means to compare a value against a threshold and record the result, i.e., to determine whether the value is above or below the threshold and record the result. The result may be recorded as a binary decision or state, for example. In addition, testing whether a value is "above or below" a threshold is more generally referred to as testing whether the value "crosses" the threshold.

In parallel with 306*a*, at 306*b*, the algorithm determines/whether metric x(k) is above or below a maximum input threshold $Th_{max}$ (also referred to as a "second threshold") that is greater than the first threshold, to produce a second value decision Ymax(k). The algorithm records the results of thresholding test 306*b* as follows:

a. Is metric x(k)>$Th_{max}$?
        Yes→Ymax(k)=1.
        No→Ymax (k)=0.

At 308*a*, the algorithm computes/obtains a first N sample moving average Avg_ymin(k) of/over the current first value decision from the current pass through 306*a* and the previous N−1 first value decisions from the previous N−1 passes through 306*a*, as follows:

$$Avg_{ymin(k)} = \frac{1}{N}\sum\nolimits_{i=0}^{N-1} ymin(k - i).$$

More generally, Avg_ymin(k) (i.e., $Avg_{ymin(k)}$ above) represents an average of a number of times N values of metric P cross the first threshold in a given time period (e.g., an N interval time period). The average represents a measure of, or quantifies, fluctuations of metric P about the first threshold in the given time period and that may be noticeable to a listener.

In parallel with 308*a*, at 308*b*, the algorithm computes/obtains a second N sample moving average Avg_ymax(k) of/over the current second value decision from the current pass through 306*b* and the previous N−1 second value decisions from the previous N−1 passes through 306*b*, as follows:

$$Avg_{ymax(k)} = \frac{1}{N}\sum\nolimits_{i=0}^{N-1} ymax(k - i).$$

More generally, Avg_ymax(k) (i.e., $Avg_{ymax(k)}$ above) represents an average of a number of times N values of metric P cross the second threshold in a given time period (e.g., an N interval time period). The average quantifies the fluctuations of metric P about the second threshold in the given time period and that may be more noticeable to a listener than are the fluctuations of metric P about the lower first threshold.

At 310*a* the algorithm determines/evaluates whether the first N sample moving average Avg_ymin(k) is above or below a minimum average threshold ThAvg2 (also referred to as a "first average threshold" or a "first fluctuation threshold"), to produce a first moving average decision Minout(k) (also referred to simply as a "first average decision" and a "first fluctuation indicator"). The algorithm records the results of thresholding test 310*a* as follows:

a. Is moving average Avg_ymin(k)>ThAvg2?
        Yes→Minout(k)=1.
        No→Minout(k)=0.

Minout(k)=1 is an indication that the number and magnitude of fluctuations in metric P in a given time period are sufficiently large to cause degradation (e.g., a first level of degradation) in the audio quality that is both noticeable and annoying to a listener; however, this may not be the worst audio degradation.

At 310*b* the algorithm determines/evaluates whether the second N sample moving average Avg_ymax(k) is above or below a maximum average threshold ThAvg2 (also referred to as a "second average threshold" or a "second fluctuation threshold"), to produce a second moving average decision Maxout(k) (also referred to simply as a "second average decision" and a "second fluctuation indicator"). In one example, the maximum and minimum average thresholds are equal. In another example, they are different. The algorithm records the results of thresholding test 310*b* as follows:

a. Is Avg_ymax(k)>ThAvg2?

Yes→Maxout(k)=1.

No→Maxout(k)=0.

Maxout(k)=1 is an indication that the number and magnitude of fluctuations in metric P in a given time period are sufficiently large to cause degradation (e.g., a second level of degradation that is higher than the first level of degradation associated with Minout(k)=1) in the audio quality that is noticeable and noticeable to a listener. This indicates the worst audio degradation (relative Minout(k)=1).

At 314, the algorithm derives a switching decision D(k) based on first average decision/fluctuation indicator Minout(k), second average decision/fluctuation indicator Maxout(k), and the previous switching decision D(k−1), collectively referred to as a "state descriptor." Note that moving averages Avg_ymin(k), Avg_ymax(k) represent intermediate fluctuation indicators, while average decisions Minout(k), Maxout(k) represent final fluctuation indicators to the algorithm. Switching decision D(k) is a decision to use either the broadcast radio signal or the wireless network connection as the source for audio content. In an example described herein, switching decision D(k) includes binary states or values (0,1), where 0 indicates to use the wireless network signal/wireless network connection and 1 indicates to use the broadcast radio signal as the source for audio content.

Operation 314 implements a decision matrix for deriving switching decision D(k). The decision matrix has the following binary inputs and outputs for switching decision D(k).

a. Inputs:

i. Previous switching decision D(k−1)-(0,1).

ii. First average decision/fluctuation indicator Minout(k)-(0,1).

iii. Second average decision/fluctuation indicator Maxout(k)-(0,1).

b. Output: switching decision D(k) based on state descriptor/inputs (D(k−1):Minout(k):Maxout(k)):

i. Inputs 0:0:1 or 1:0:1

Illegal State (restart process). Maxout(k) should not be high (which indicates a high level of audio degradation/bad audio quality) when Minout(k) is low (which indicates a low level of audio degradation).

ii. Inputs 0:0:0 (low metrics—indicates low audio degradation, good audio quality)

Output D(k)=1. Switch from the wireless network connection to the broadcast radio signal.

iii. Inputs 0:1:0 or 0:1:1

Output D(k)=0 (no state change). Follow previous switching decision, so stay on the wireless network connection.

iv. Inputs 1:0:0 or 1:1:0

Output D(k)=1 (no state change). Follow previous switching decision, so stay on broadcast radio signal because the audio degradation is not too bad. This introduces hysteresis that maintains the switching decision on the broadcast radio signal even though Minout(k)=1 indicates that audio degradation due to fluctuations has exceeded a first level, at least while Maxout(k)=0; the switching decision will only switch to the wireless network connection when the audio degradation due to fluctuations has exceeded a second level as well, i.e., when both Minout(k)=1 and Maxout(k)=1 (see (v) below).

v. Inputs 1:1:1 (high metrics—indicates high audio degradation)

Output D(k)=0.

At 316, the algorithm "time-stretches" or delays switching decision D(k), to produce switching signal SW(k) (or "output SW(k)") that follows the switching decision. In other words, operation 316 outputs SW(k) as a delayed version of switching decision D(k), subject to conditions presented below. The purpose of time-stretching switching decision D(k) into SW(k) is to avoid overly aggressive switching between audio sources that could be annoying to the listener. The pulse-stretching feature of operation 316 is optional. For the example described below, output SW(k) includes binary states or values (0,1) similar to switching decision D(k), where 0 or 1 causes source selector 206 to select audio content 239 from the wireless network connection or audio content 222 from the broadcast radio signal as output audio content 250, respectively.

Operation 316 derives output SW(k) based on (i) a continuously running hold timer implemented by controller 210 and that presents a Time Value to the algorithm at any given time, and (ii) hold timer logic to reset the timer based on decisional logic evaluated based on current switching decision D(k), previous switching decision D(k−1), the Timer Value, and timer threshold values Th(Hold0) and Th(Hold1).

At 318, the hold timer logic reads the Timer Value, receives switching decisions D(k):D(k−1), and implements the following hold time decision matrix/logic having the inputs and output (Output SW(k)) shown below.

a. Inputs:

i. Previous switching decision D(k−1).

ii. Current switching decision D(k).

iii. Timer Value.

b. Output SW(k) based on inputs D(k−1):D(k) and the Timer Value:

i. 0:0 or 1:1—There is no change between D(k−1) and D(k) because D(k) follows D(k−1)

SW(k)=D(k), No change, No Timer Reset (322).

ii. 1:0—Switching decision transition from wireless network connection to broadcast radio signal Is Timer Value>Th(Hold1)? (324)

Yes→SW(k)=0, Reset Timer (326).

No→SW(k)=D(k), No change, No Timer Reset (328).

iii. 0:1—Is Timer Value>Th(Hold0)? (330)

Yes→SW(k)=1, Reset Timer (332).

No→SW(k)=D(k), No Change, No Timer Reset (334).

In an embodiment, the algorithm may qualify switching decisions that result in a transition from using the broadcast radio signal to using the wireless network connection as the source for audio content (e.g., see the switching decision set forth in paragraph 45(b) (v) above). The algorithm may qualify such a switching decision based on the wireless network connection quality indicator provided by network radio 204, discussed above in connection with FIG. 2. For example, whenever the switching decision would result in a switch from the broadcast radio signal to the wireless network connection, the algorithm first determines whether the wireless network connection quality indicator indicates that the wireless network connection is good or bad. When the wireless network connection is good, the algorithm allows the switch/transition. When the wireless network connection is bad, the algorithm does not allow the switch, i.e., overrides the switching decision. In the latter case, the algorithm maintains connection to the broadcast radio signal as the source for the audio content. In summary, the algorithm determines whether to override a switching decision that would result in a transition from using the broadcast radio signal as the source of the audio content to using the wireless network connection as the source of the audio content based on the wireless network connection quality indicator: bad quality—override, good quality—do not override.

As described above, the values of various parameters/variables of the switching algorithm influence the outcomes of the operations performed by the switching algorithm. The parameters include, for example, a time interval for collecting values of metric P, a number N of decisions to be averaged, first, second, and third thresholds $Th_{min}$, $Th_{max}$, and ThAvg2, respectively, and timer thresholds Th(Hold0) and Th(Hold1). The values of the parameters drive an aggressiveness, i.e., how often, the switching decision of the switching algorithm switches between the broadcast radio signal and the wireless network connection. For example, lower vs. higher values for thresholds $Th_{min}$ and $Th_{max}$ tend to increase vs. decrease the aggressiveness of switching between the sources, i.e., how often the switching algorithm switches between a decision to use the broadcast radio signal and a decision to use the wireless network radio.

In addition to driving the aggressiveness of the switching decision, the values of the parameters may be configured (i.e., have values set) to bias the switching decision in favor of the broadcast radio signal over the wireless network connection based on the previous source decision and the fluctuation indicators. Alternatively, the values of the parameters may be configured to bias the switching decision in favor of the wireless network connection over the broadcast radio signal based on the previous source decision and the fluctuation indicators.

In an embodiment, the values of the parameters/variables are configurable/programmable. Initial values may be programmed during an a priori configuration/provisioning operation performed on the hybrid radio receiver. Subsequently, values of the parameters may be updated/programmed dynamically over time by a radio broadcaster, to achieve desired audio performance and switching aggressiveness, and to achieve a desired switching decision bias in favor of the broadcast radio signal or the wireless network connection. To update the parameters dynamically, a radio broadcaster may be configured to transmit a parameter update command/message as a data packet to the hybrid radio receiver over the wireless network connection. The parameter update command may include (i) an IP address for the network radio (i.e., that matches that assigned to the network radio), (ii) a message type identifier (MTI) to identify the message as a parameter update message for the switching algorithm, (iii) identifiers of the switching algorithm parameters to be updated, and (iv) update values for the identified parameters. An example parameter update command is shown below in Table 2.

TABLE 2

Network Radio IP address
Message/Command Type =
Parameter Update
Parameter 1: Update Value
Parameter 2: Update Value
Parameter 3: Update Value Upon receiving the data packet that includes the parameter update command (recognized by the network radio based on parsing of the data packet to retrieve and recognize the IP address and the Message/Command Type), the network radio retrieves the update values for the identified parameters from the parameter update command, and updates the identified parameters in the switching algorithm with their corresponding update values. In summary, the switching algorithm includes operations that perform deriving the fluctuation indicators based on parameters having values that are programmable and that influence how often the switching decision of the switching algorithm performs switching between the broadcast radio signal and the wireless network connection, and a source selection bias associated with the switching decision. Updating the parameters dynamically may include receiving update values for the parameters over the wireless network connection in a parameter update command and updating the parameters with the update values from the parameter update command to adjust how often (i.e., how aggressively) the switching decision performs the switching between the broadcast radio signal and the wireless network connection, and/or to adjust the bias of the switching decision. The aforementioned parameter update technique has the advantage that the same parameter values affect all hybrid radio receivers that are fielded equally in terms of perceived audio quality regardless of their antenna system/radio quality. Thus, the parameter update technique permits a broadcaster to provide a certain level of quality, which over time could possibly favor either the wireless network connection or the broadcast radio signal as the business climate changes (e.g., streaming royalty charges decrease).

FIG. 4 is a flowchart of an example method 400 of deriving the switching decision based on metric P, i.e., a method performed by the switching algorithm. Method 400 may be performed primarily by a controller (e.g., controller 210) in a hybrid radio receiver (e.g., hybrid radio receiver 110) configured to recover audio content separately from a broadcast radio signal and from a wireless network connection.

At 402, at periodic intervals, the controller collects values (e.g., x(k)) of a metric (e.g., metric P) that indicates audio quality of the audio content in the broadcast radio signal. At each interval (e.g., for each k), the controller performs operations 404-410, described below.

At 404, the controller computes a first average (e.g., first moving average Avg_min(k)) of how many of N values of the metric (including a current value and N−1 previous values) exceed/cross a first threshold (e.g., $Th_{min}$), and computes a second average (e.g., Avg_max(k)) of how many of the N values exceed a second threshold (e.g., $Th_{max}$) that is greater than the first threshold. In an example, the first average averages first value decisions (e.g., Ymin(k)) that result from thresholding the values against the first threshold, and the second average averages second value decisions (e.g., Ymax(k)) that result from thresholding the values against the second threshold.

At 406, the controller obtains a first average decision/fluctuation indicator (e.g., Minout(k)) and a second average decision/fluctuation indicator (Maxout(k)) to indicate whether the first average and the second average exceed a third threshold (e.g. ThAvg2), respectively.

At 408, the controller derives a source decision (e.g., D(k)) to use either the broadcast radio signal or the wireless network connection as a source of the audio content based on a previous source decision (e.g., D(k−1)), the first average decision/fluctuation indicator (e.g., Minout(k)), and the second average decision/fluctuation indicator (Maxout(k)). The previous source decision, the first average decision, and the second average decision may include binary decisions, respectively, and collectively represent a state descriptor that is evaluated for each interval. The controller derives the switching decision based on the state descriptor to bias the switching decision in favor of the broadcast radio signal over the wireless network connection, or in favor of the wireless network connection over the broadcast radio signal, for example, and to introduce hysteresis into the switching decision.

At 410, the controller selects either the broadcast radio signal or the wireless network connection as the source of the audio content based on the switching decision (e.g., SW(k) follows D(k)).

FIG. 5 is a flowchart of another example method 500 of deriving the switching decision based on metric P. Method 500 may be performed primarily by a controller in a hybrid radio receiver configured to recover audio content separately from a broadcast radio signal and from a wireless network connection.

At 502, the controller receives values (e.g., x(k)) of a metric (e.g., of metric P) that indicate audio quality of the audio content in the broadcast radio signal at any given time.

At 504, the controller computes/derives, from fluctuations of the values of the metric over time, indicators of fluctuations (i.e., fluctuation indicators) of audio quality fluctuations that are likely noticeable to a listener. Controller 504 may compute the fluctuation indicators (represented by Avg_ymin(k), Minout(k), Avg_ymax(k), and Maxout(k), for example) using operations described above in connection with FIGS. 3 and 4.

For example, the controller computes a first fluctuation indicator (e.g., Avg_ymin(k), Minout(k)) based on/as a function of a first number of times the values of the metric cross a first threshold (e.g., $Th_{min}$) during a time period, and computes a second fluctuation indicator (e.g., Avg_ymax(k), Maxout(k)) based on/as a function of a second number of times the values of the metric cross a second threshold (e.g., $Th_{max}$) during the time period. Even further, the first fluctuation indicator may be based on a first average of the first number of times the values cross the first threshold, and the second fluctuation indicator may be based on a second average of the second number of times the values cross the second threshold.

At 506, the controller derives a switching decision (e.g., D(k)) to use the broadcast radio signal or the wireless network connection as a source of the audio content based on a previous switching decision (e.g., D(k−1)) and the fluctuation indicators (e.g., first fluctuation indicator Minout (k), second fluctuation indicator Maxout(k)) to introduce hysteresis into the switching decision, and to favor the broadcast radio signal (or alternatively, the wireless network connection). The controller derives the switching decision according to the following decision matrix:

a. (0:0:0, operation 314(*ii*) above) When the previous switching decision is to use the wireless network connection, and the first fluctuation indicator and the second fluctuation indicator each do not exceed a fluctuation threshold (e.g., ThAvg2), set the switching decision to use the broadcast radio signal (e.g., D(k)=1).

b. (0:1:0 or 0:1:1, operation 314(*iii*) above) When the previous switching decision is to use the wireless network connection, and at least the first fluctuation indicator exceeds the fluctuation threshold, the switching decision follows the previous switching decision.

c. (1:0:0 or 1:1:0, operation 314(*iv*) above) When the previous switching decision is to use the broadcast radio signal, the first fluctuation indicator either exceeds or does not exceed the fluctuation threshold, and the second fluctuation indicator does not exceed the fluctuation threshold, the switching decision follows the previous switching decision. This introduces hysteresis because the switching decision maintains its current setting even when the first switching decision exceeds the fluctuation threshold, and holds until the second fluctuation decision also exceeds the fluctuation threshold; at which time the switching decision reverts to the wireless network connection (see (d) below).

d. (1:1:1, operation 314(*v*) above) When the previous switching decision is to use the broadcast radio signal, and the first fluctuation indicator and the second fluctuation indicator each exceed the fluctuation threshold, set the switching decision to use the wireless network connection.

At 508, the controller selects the broadcast radio signal or the wireless network connection as the source of the audio content based on the switching decision.

In other embodiments, hybrid radio receiver 110 may further include a radio receiver configured to process a digitally modulated radio signal, such as an HD radio signal, to recover audio content from the digitally modulated radio signal separately from network radio 204, and to provide the audio content to source selector 206. The radio receiver may be in place of, or added to, radio broadcast receiver 202. The radio receiver may monitor a quality of the digitally modulated radio signal, and provide an indicator or metric (similar to metric P) that indicates such quality to controller 210. Controller 210 may implement a switching algorithm similar to that described above to render a switching decision to use the digitally modulated radio signal or the wireless network signal as a source of audio content.

In summary, in one embodiment, a method is provided comprising: at a hybrid radio receiver configured to recover audio content separately from a broadcast radio signal and from a wireless network connection: receiving a reception metric that indicates audio quality of the audio content in the broadcast radio signal at any given time; deriving, from fluctuations of the reception metric over time, fluctuation indicators that indicate audio quality fluctuations that are likely noticeable to a listener; deriving a switching decision to use the broadcast radio signal or the wireless network connection as a source of the audio content based on a previous switching decision and the fluctuation indicators; and selecting the broadcast radio signal or the wireless network connection as the source of the audio content based on the switching decision.

In another embodiment, an apparatus in the form of a hybrid radio receiver is provided comprising: a radio broadcast receiver to recover audio content from a broadcast radio signal, and to derive a metric that indicates audio quality of the audio content at any given time; a network radio to recover audio content from a wireless network connection; and a controller to perform: deriving fluctuation indicators indicative of the audio quality that are likely noticeable to a listener by (i) deriving a first fluctuation indicator based on a number of times the metric crosses a first threshold during a time period, and (ii) deriving a second fluctuation indicator based on a number of times the metric crosses a second threshold that is greater than the first threshold during the time period; and deriving a switching decision to use the broadcast radio signal or the wireless network connection as a source of audio content based on a previous switching decision, the first fluctuation indicator, and the second fluctuation indicator to introduce hysteresis into the switching decision.

In yet another embodiment, a non-transitory computer readable medium is provided. The medium is encoded with instructions that, when executed by a processor of a hybrid radio receiver configured to recover audio content separately from a broadcast radio signal and from a wireless network connection, cause the processor perform: at periodic intervals, collecting values of a metric that indicates audio quality of the audio content in the broadcast radio signal and, at each interval, performing: computing a first average of how many of N values of the metric exceed a first threshold, and computing a second average of how many of the N values exceed a second threshold that is greater than the first threshold; obtaining a first average decision and a second average decision to indicate whether the first average and the second average exceed a third threshold, respectively; and deriving a switching decision to use either the broadcast radio signal or the wireless network connection as a source of audio content based on a previous source decision, the first average decision, and the second average decision; and selecting the source of audio content based on the switching decision.

Although the techniques are illustrated and described herein as embodied in one or more specific examples, it is nevertheless not intended to be limited to the details shown, since various modifications and structural changes may be made within the scope and range of equivalents of the claims.

Each claim presented below represents a separate embodiment, and embodiments that combine different claims and/or different embodiments are within the scope of the disclosure and will be apparent to those of ordinary skill in the art after reviewing this disclosure.

What is claimed is:

1. A method comprising:

at a hybrid radio receiver configured to recover audio content separately from a broadcast radio signal and from a wireless network connection:

receiving a reception metric that indicates audio quality of the audio content in the broadcast radio signal at any given time;

deriving, a first fluctuation indicator based on a number of occurrences in which the reception metric exceeds a first threshold over time and a second fluctuation indicator based on a number of occurrences in which the reception metric exceeds a second threshold that is greater than the first threshold over the time;

deriving a switching decision to use the broadcast radio signal or the wireless network connection as a source of the audio content based on a combination of a previous switching decision, the first fluctuation indicator and the second fluctuation indicators; and selecting the broadcast radio signal or the wireless network connection as the source of the audio content based on the switching decision.

2. The method of claim 1, wherein deriving includes deriving the switching decision based on the previous switching decision and the fluctuation indicators to introduce hysteresis into the switching decision.

3. The method of claim 1, wherein deriving the switching decision includes:

when the previous switching decision is to use the wireless network connection, and the first fluctuation indicator and the second fluctuation indicator each does not exceed a fluctuation threshold, deriving the switching decision to use the broadcast radio signal.

4. The method of claim 3, wherein deriving the switching decision includes:

when the previous switching decision is to use the broadcast radio signal, and the first fluctuation indicator and the second fluctuation indicator each exceed the fluctuation threshold, deriving the switching decision to use the wireless network connection.

5. The method of claim 1, wherein deriving the switching decision includes:

when the previous switching decision is to use the broadcast radio signal, the first fluctuation indicator either exceeds or does not exceed a threshold, and the second fluctuation indicator exceeds a fluctuation threshold, following the previous switching decision.

6. The method of claim 5, wherein deriving the switching decision includes:

when the previous switching decision is to use the wireless network connection, and at least one of the first fluctuation indicator and the second fluctuation indicator exceeds the threshold, following the previous switching decision.

7. The method of claim 1, wherein the audio content includes audio and metadata.

8. The method of claim 1, wherein deriving the switching decision includes deriving the switching decision without using received signal strength indicator (RSSI) values for the broadcast radio signal.

9. The method of claim 1, wherein the reception metric is derived from the audio content recovered from the broadcast radio signal.

10. The method of claim 1, wherein the broadcast radio signal includes a frequency modulated (FM) broadcast signal.

11. The method of claim 1, wherein the wireless network connection includes a cellular or WiFi connection.

12. The method of claim 1, wherein deriving the fluctuation indicators includes deriving the fluctuation indicators based on parameters having values that are programmable and that influence how often the switching decision performs switching between the broadcast radio signal and the wireless network connection, and the method further comprises:

receiving update values for the parameters over the wireless network connection and updating the parameters with the update values to adjust how often the switching decision performs the switching between the broadcast radio signal and the wireless network connection.

13. A hybrid radio receiver comprising:

a radio broadcast receiver to recover audio content from a broadcast radio signal, and to derive a metric that indicates audio quality of the audio content at any given time;

a network radio to recover audio content from a wireless network connection; and a controller to perform:

deriving fluctuation indicators indicative of the audio quality that are likely noticeable to a listener by (i) deriving a first fluctuation indicator based on a number of occurrences in which the metric exceeds a first threshold during a time period, and (ii) deriving a second fluctuation indicator based on a number of occurrences in which the metric exceeds a second threshold that is greater than the first threshold during the time period; and deriving a switching decision to use the broadcast radio signal or the wireless network connection as a source of audio content based on a combination of a previous switching decision, the first fluctuation indicator, and the second fluctuation indicator to introduce hysteresis into the switching decision.

14. The hybrid radio receiver of claim 13, wherein the controller is further configured to perform:

selecting the source of audio content based on the switching decision.

15. The hybrid radio receiver of claim 13, wherein:

the controller is configured to perform deriving the first fluctuation indicator by computing a first average by dividing the number of occurrences in which the metric exceeds the first threshold at respective time periods by a total number of the time periods; and the controller is configured to perform deriving the second fluctuation indicator by computing a second average by dividing of the number of occurrences in which the metric exceeds the second threshold at the respective time periods by the total number of the time periods.

16. The hybrid radio receiver of claim 15, wherein:

the controller is further configured to perform deriving the first fluctuation indicator by thresholding the first average against an average threshold, to produce the first fluctuation indicator; and the controller is further configured to perform deriving the second fluctuation indicator by thresholding the second average against the average threshold, to produce the second fluctuation indicator.

17. The hybrid radio receiver of claim 13, wherein the controller is configured to perform deriving the switching decision without using received signal strength indicator (RSSI) values for the broadcast radio signal.

18. A non-transitory computer readable medium encoded with instructions that, when executed by a processor of a hybrid radio receiver configured to recover audio content separately from a broadcast radio signal and from a wireless network connection, cause the processor to perform:

at periodic intervals, collecting values of a metric that indicates audio quality of the audio content in the broadcast radio signal and, at each interval, performing:

computing a first average by dividing a number of occurrences in which the metric exceeds a first threshold at respective periodic intervals by a total number of the periodic interval of the periodic intervals, and computing a second average by dividing a number of occurrences in which the metric exceeds a second threshold that is greater than the first threshold at the respective periodic intervals by the total number of the periodic intervals;

obtaining a first average decision and a second average decision to indicate whether the first average and the second average exceed a third threshold, respectively; and deriving a switching decision to use either the broadcast radio signal or the wireless network connection as a source of audio content based on a combination of a previous source decision, the first average decision, and the second average decision; and selecting the source of audio content based on the switching decision.

19. The non-transitory computer readable medium of claim 18, further comprising instructions to cause the processor to perform, at each interval:

obtaining a current first value decision that indicates whether a current value of the metric exceeds the first threshold, wherein computing the first average includes computing the first average as a first moving average of the current first value decision and previous first value decisions; and obtaining a current second value decision that indicates whether the current value exceeds the second threshold, wherein computing the second average includes computing the second average as a moving average of the current second value decision and previous second value decisions.

* * * * *